(12) United States Patent
De Zuazo Torres

(10) Patent No.: US 6,286,990 B1
(45) Date of Patent: Sep. 11, 2001

(54) BATTERY POWERED APPARATUS FOR STIRRING A PRODUCT IN ANY ONE OF A PLURALITY OF VESSELS OF DIFFERENT DIAMETER AND DEPTH

(76) Inventor: Pedro Luis De Zuazo Torres, San Dimas No. 5, 1st, 28015 Madrid (ES)

( * ) Notice: Subject to any disclaimer, the term of this patent is extended or adjusted under 35 U.S.C. 154(b) by 0 days.

(21) Appl. No.: 09/529,649

(22) PCT Filed: Oct. 30, 1998

(86) PCT No.: PCT/ES98/00295

§ 371 Date: Apr. 17, 2000

§ 102(e) Date: Apr. 17, 2000

(87) PCT Pub. No.: WO99/22632

PCT Pub. Date: May 14, 1999

(30) Foreign Application Priority Data

Nov. 4, 1997 (ES) ................................................ 9702843 U

(51) Int. Cl.[7] ...................................................... B01F 7/18
(52) U.S. Cl. ............................................................ 366/282
(58) Field of Search .................................. 366/242–251, 366/281–284, 286; 99/348

(56) References Cited

U.S. PATENT DOCUMENTS

| 723,977 | * | 3/1903 | Barney . |
| 3,011,768 | * | 12/1961 | Clark . |
| 3,357,685 | * | 12/1967 | Stephens . |
| 4,184,779 | | 1/1980 | Detmer . |
| 4,832,501 | | 5/1989 | McCauley . |
| 4,921,356 | | 5/1990 | Bordenga . |
| 5,013,158 | * | 5/1991 | Tarlow ................................ 366/251 |
| 5,372,422 | * | 12/1994 | Dubroy ............................... 366/282 |
| 5,516,208 | | 5/1996 | Givant . |
| 5,613,425 | | 3/1997 | Krznaric . |
| 5,676,464 | * | 10/1997 | Mattar ................................ 366/282 |
| 5,711,602 | * | 1/1998 | Rohring et al. ..................... 366/251 |
| 5,816,136 | * | 10/1998 | Stallings ............................. 99/348 |
| 5,863,121 | * | 1/1999 | Dunk .................................. 366/286 |

* cited by examiner

Primary Examiner—Charles E. Cooley
(74) Attorney, Agent, or Firm—Ladas & Parry

(57) ABSTRACT

An apparatus for stirring a product in any one of a plurality of vessels of different diameter and depth, wherein each of the plurality of vessels has a mouth. The apparatus includes: (a) a support base for attaching the apparatus to any one of the respective mouths of the plurality of vessels, the support base includes (i) a base; (ii) a plurality of articulated arms, (iii) a clamp disposed on each of the articulated arms for clamping the apparatus to any one of the vessel mouths, and (iv) a joiner for separately joining each of the articulated arms to the base with the articulated arms positionable with respect to the base at any of a plurality of angles; (b) a stirrer for stirring the product in any one of the plurality of vessels with the apparatus clamped to the mouth of the any one of the plurality of vessels; the stirrer includes (i) a cross piece; (ii) a plurality of stirrer aims and (iii) a connector for connecting the stirrer arms to the cross piece at an angle that adjusts to the diameter of the vessel; (c) a body attached to the base having a first axle for driving a motor reducer for imparting power to the stirrer and (d) a telescopic shaft connecting the first axle to the stirrer for transmitting power to the stirrer and for supporting the stirrer at any of a plurality of distances from the base. The apparatus may be battery powered.

9 Claims, 3 Drawing Sheets

Figure 1:
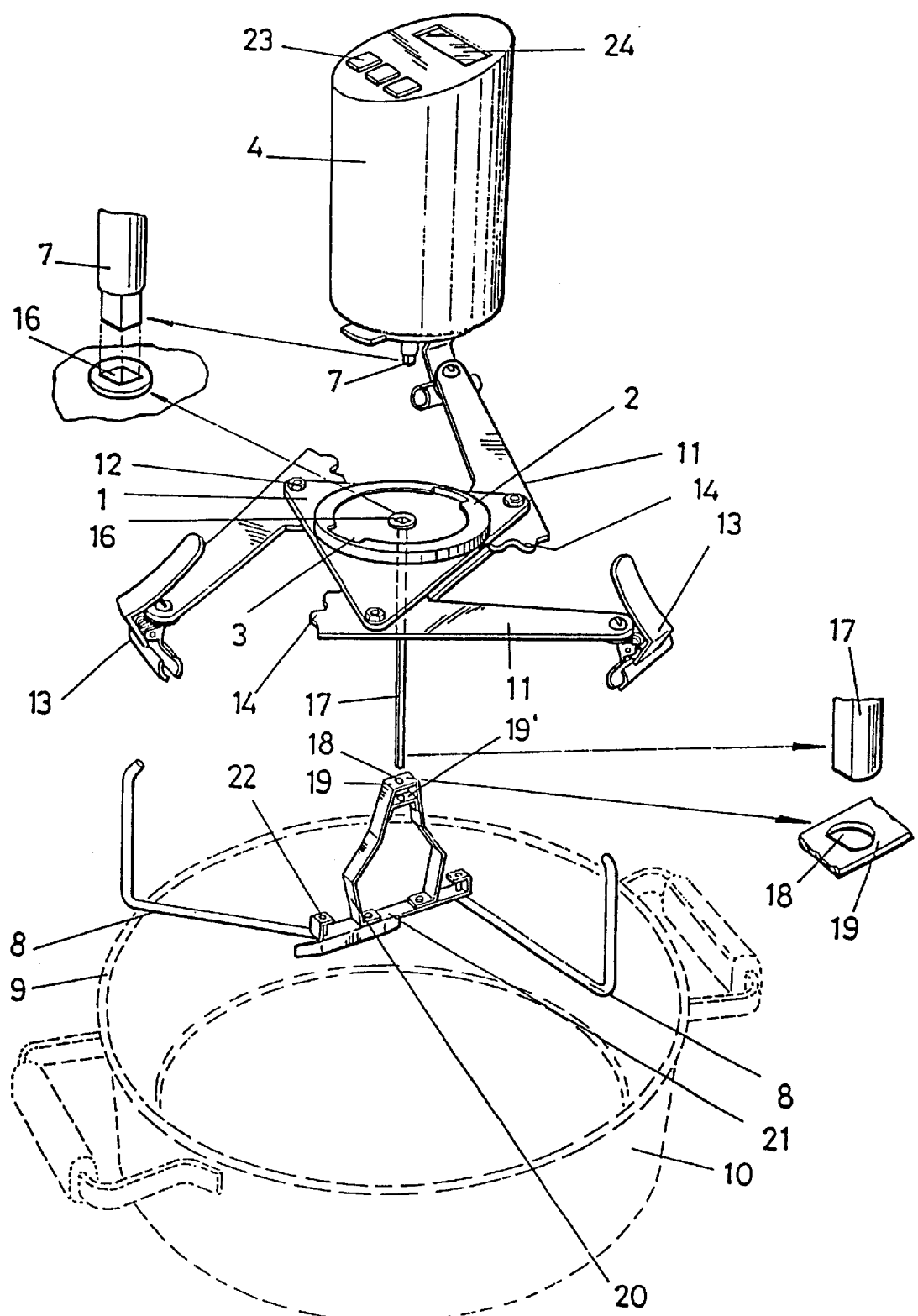

BATTERY POWERED APPARATUS FOR STIRRING A PRODUCT IN ANY ONE OF A PLURALITY OF VESSELS OF DIFFERENT DIAMETER AND DEPTH

PURPOSE OF THE INVENTION

This present invention refers to a stirring device which has been specially conceived to be attached to kitchen vessels such as pots, saucepans and the like, with the advantage that the stirrer may be adapted to vessels which are substantially different both in size and in height.

The stirrer is especially useful for cooking soups, purees, sauces and, in general, liquid or pasty products which require slow and continuous stirring throughout their cooking process.

BACKGROUND OF THE INVENTION

It is well known that there is an infinite number of kitchen recipes in which, for the best results, it is necessary to stir the product slowly while it is being cooked.

This task of stirring is very wearisome for the cook, and can even be very tiring in the case of products of a certain density, or which must be stirred relatively quickly.

The obvious solution to this problem would consist of using a duly mechanized stirrer which would turn at the correct speed and have blades to stir the product.

However, this apparently very easy solution faces practical problems deriving from the inevitable fact that in any kitchen there is a large number of vessels of different sizes which must also be used specifically at certain times, precisely because of their size, because of the amount or the nature of the product being prepared.

Therefore, it would be necessary to have a different stirrer for each size of kitchen vessel, thus implying a practical complexity which would make this solution completely non-viable.

Other solutions have been proposed by the Patents U.S. Pat. No. 5,613,425 and U.S. 4,184,779 but these patents offered a lot of difficulties in the manufacture that have been solved by the present invention.

SUMMARY OF THE INVENTION

The stirrer proposed in this invention resolves the above problem in a perfectly satisfactory manner, by permitting it to be adapted to any size of kitchen vessel, of whatever diameter or effective height.

The stirrer described here is made up of a support base for a motor reducer group, fixed to said base, The base, fits centrally on the mouth of any kitchen vessel, has articulated arms, the radial disposition of which makes it possible for their free ends to be contained within an imaginary circle of greater diameter than that of the mouth of the largest kitchen vessel foreseen for the purpose, so that a greater or lesser degree of oscillation of these arms means that their effective length will adapt to the diameter of any kitchen vessel.

Likewise, in order to ensure that the imaginary axle of the support base is always in the center of the mouth of the vessel, the inside, or articulated end, of the arms contains a gearing, by means of which they are related to a common center, also geared, which determines a perfectly synchronized oscillation movement for each of the arms, which have at their free end a clamp, of any appropriate conventional type, to attach them to the mouth of the kitchen vessel.

Said support base receives, preferably by means of a bayonet attachment system, an upper part containing said motor reducer group, assisted by an electric circuit with a speed selector, allowing the device to work at two or more speeds, thus adapting the work speed to the type of product being prepared, a switch to set it going and a timer to control at will the duration of the operative cycle, also on the basis of the type of product being prepared.

The motor may be supplied either by rechargeable batteries inside an operative housing fixed to the same body containing the motor reducer, or directly from a main, in which case, instead of the batteries, there will be a rectifier circuit to transform the alternating current of the main into direct current appropriate for the motor reducer.

In any case, from the bottom end of said body there emerges a short motor axle, which is keyed to a considerably longer axle, conveniently associated to the support base, which by mans of another key, is attached telescopically to the shaft bearing the moving blades. This shaft has at least two transverse baffles, at a substantial distance from each other, with holes to attach to the axle, so that the distance between these baffles ensures the permanent vertical position of the shaft, which ends in a lower cross-piece to the symmetrical, free ends of which the stirring arms themselves are attached, adopting a bent position in order to act both on the base and on the sides of the kitchen vessel. The length of the lower or horizontal arm is such that, together with the other arm placed in the intermediate cross piece, it is always greater than the maximum diameter of the kitchen vessel, so that the stirring arms themselves form variable angles as regards the intermediate cross piece, almost 180° C. as the vessel gets wider, although never actually attaining this maximum mark.

The telescopic nature through which the axis joined to the support base is related to the central shaft of the stirring arms, allows these arms to always adapt to the bottom of the vessel, as well as to its sides, whatever its depth.

BRIEF OF THE DRAWINGS

In order to complement the description being made here and to help towards a better understanding of the characteristics of the invention, there is provided a set of illustrative, though not limiting, drawings, showing the following:

FIG. 1.—This is an exploded view, in perspective, of the pot stirrer in accordance with this invention.

Figure 2:
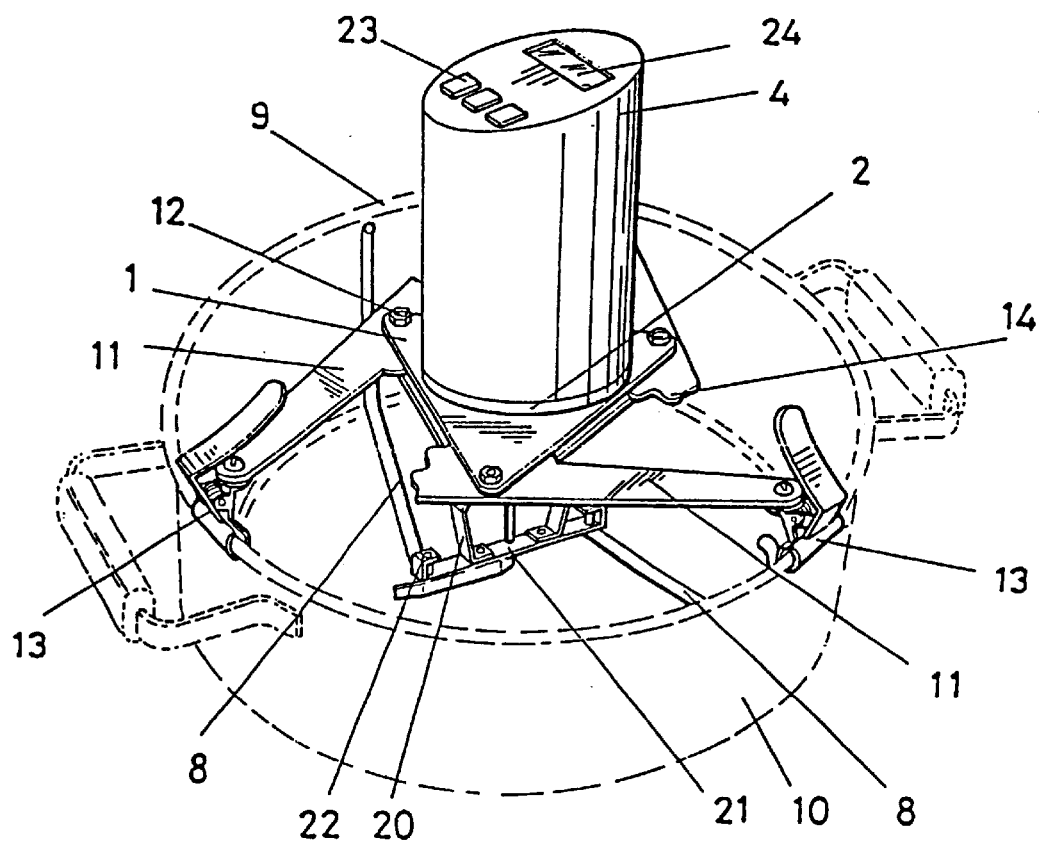

FIG. 2.—This is a perspective view of the pot shown in FIG. 2, properly assembled.

Figure 3:
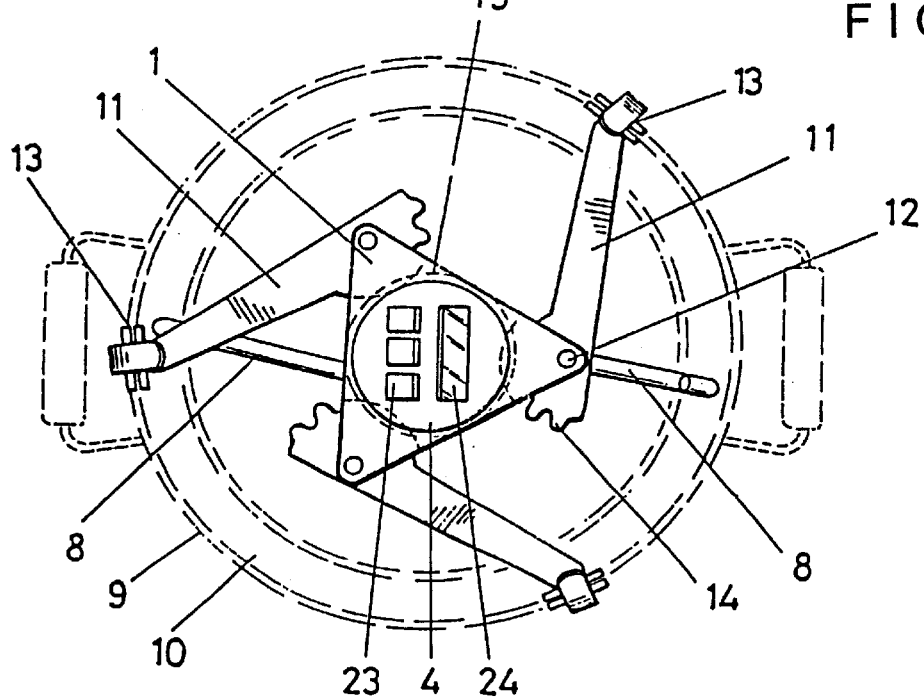

FIG. 3.—This is a plan view of the stirrer of FIG. 2.

Figure 4:
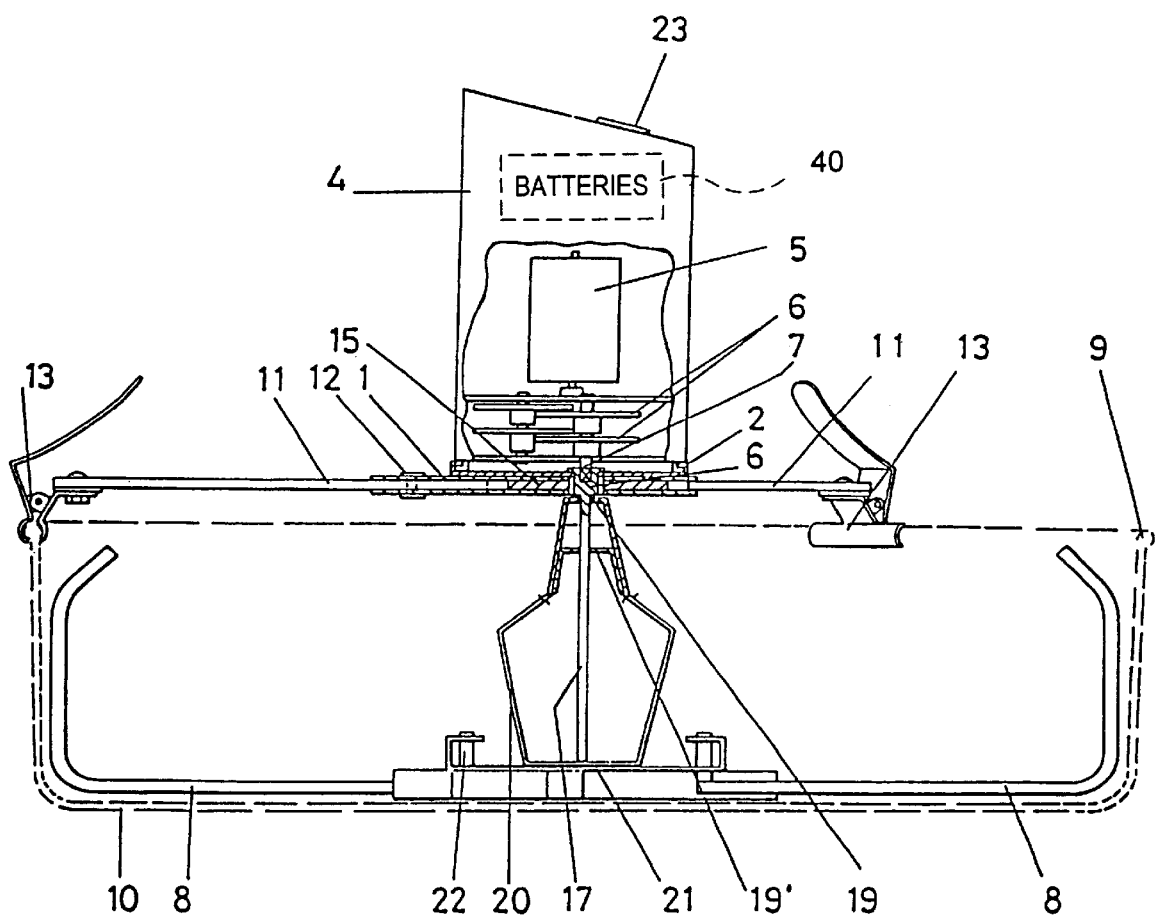

FIG. 4.—This, is side view, insection of the stirrer shown in FIG. 2.

PREFERRED MODE OF CARRYING OUT THE INVENTION.

In view of these figures it may be seen that the stirrer proposed here is made up of a base (1), which in the preferred embodiment shown in the drawings is an equilateral triangle in shape, although it can be any other shape, without this in the least affecting the essence of the invention. The base has in its upper part a cylindrical neck (2) to which, by bayonet system (3) is attached the bottom part of a body (4) containing an electrical motor (5), preferably direct current, assisted by a group of reducing gears (6) ending off in an exit axle (7) though which it transmits the movement of a pair of lower stirring arms (8), of which reference will be made.

The base (1) is designed to be attached to the mouth (9) of any appropriate kitchen vessel (10), for which it has three articulated arms (11) which, through articulated axes (12) are related with the corresponding vertices of the base (1), and have on their free ends clamps (13), of any conventional type, by means of which said arms (11) and, consequently, the base (1), are attached to the edge (9) of the mouth of the recipient (10), in a perfectly stable manner.

So that the base (1) is perfectly centered in the mouth (9) of the vessel (10), the arms (11) have synchronized movement, each of them having a geared section (14), concentric with its own articulation axle (12). The geared sections (14) of the three arms (11) are related to a common center (15), also geared, situated in the center of the base (1), so that this enter forces any oscillation movement of any one of the arms (11) to be transmitted simultaneously and in a synchronized manner to the other two.

The base (1) has an axial hole (16) to which to attach the exit axis (7) of the motor reducer group, specifically where there is another axle (17) which may be keyed to the axle (7), this axle (17) being quite long, in order to be able to vary substantially the distance in height between the base (1) and the stirring arms (8), this axle (17) being keyed telescopically in holes (18) made in two horizontal baffles (19, 19'), at a substantial difference from each other, belonging to a shaft (20) to which the stirring arms (8) are associated.

More specifically this shaft (20) finishes below in a cross piece (21), rigidly joined thereto, with symmetrical joints (22) at its ends for the stirring arms (8), which take on a bent orthogonal position, to act both on the bottom and on the sides of the kitchen vessel (10)

In accordance with this structure and as stated above, the base (1) may be attached to the mouth of kitchen vessels of substantially different diameters, merely by placing the arms (11) at the right angle. At the same time the stirring arms (8) adapt to the bottom and sides of the vessel (10) as regards a wide range of depths, thanks to the telescopic connection in the transmission from the axle (17) to the shaft (20), which gives the stirrer a high level of versatility.

Complimentarily to the structure described above, and as stated above, the direct current electric motor (5) (FIG. 4) may be supplied by means of rechargeable batteries (40) situated within a housing on the body itself (4), or be supplied from a main by means of a transformer-rectifier circuit. In any case, it will have a switch, a timer and a speed selector, with controls (23) fixed to the upper base of the body (4), as well as a small screen (24) (FIG. 2) to visualize the functions, which may also include other complementary functions such as watch, chronometer, etc.

It is not considered necessary to extend this description, as any person of skill in the art will understand the scope of the invention and the advantages which derive therefrom.

What is claimed is:

1. An apparatus for stirring a product in any one of a plurality of vessels of different diameter and depth, wherein each of the plurality of vessels has a mouth, said apparatus comprising:
    (a) support base means for attaching the apparatus to any one of the respective mouths of the plurality of vessels, said support base means comprising:
        (i) a base;
        (ii) a plurality of articulated arms;
        (iii) clamp means disposed on each of the articulated arms for clamping the apparatus to any one of the vessel mouths, and
        (iv) joint means for separately joining each of the articulated arms to the base with the articulated arms positionable with respect to the base at any of a plurality of angles;
    (b) stirrer means for stirring the product in any one of the plurality of vessels with the apparatus clamped to the mouth of said any one of the plurality of vessels, said stirrer means comprising:
        (i) a cross piece;
        (ii) a plurality of stirrer arms, each of said plurality of stirrer arms being articulated;
        (iii) means for connecting the stirrer arms to the cross piece at an angle that adjusts to the diameter of the vessel;
    (c) a body attached to the base comprising a motor and motor reducer means, including a first axle, for imparting power from the motor to the stirrer means;
    (d) means for supplying current to the motor; and
    (e) telescopic shaft means connecting the first axle to the stirrer means for transmitting power to the stirrer means and for supporting the stirrer means at any of a plurality of distances from the base.

2. An apparatus according to claim 1, wherein said plurality of articulated arms comprise gear means, including a plurality of gears with teeth, for synchronizing movement of said plurality of articulated arms so that, with the apparatus clamped to one of the mouths of the vessels, the base is centered in said one of the mouths.

3. An apparatus according to claim 2, wherein the support base means comprises a cylindrical neck with means for attaching the base to the body.

4. An apparatus according to claim 1, wherein the shaft means comprises (i) a plurality of transverse baffles each of which comprises a hole and (ii) a second axle having a hollow upper end that receives the lower end of the first axle, said second axle passing through a hole in the base and the respective holes in the plurality of transverse baffles.

5. An apparatus according to claim 1, wherein the motor reducer means comprises means, including a switch, a timer and a speed selector, for causing the stirrer arms to work in any of a plurality of operating modes.

6. An apparatus according to claim 5, wherein the body comprises control means for controlling operation of the stirrer arms and liquid crystal display screen means for visualization of the operating modes.

7. An apparatus according to claim 1, wherein each of the plurality of articulated arms has an angular configuration.

8. An apparatus according to claim 7, wherein the apparatus comprises three of the articulated arms.

9. An apparatus according to claim 1, wherein the means for supplying current comprises a battery disposed within the body.

* * * * *